United States Patent
Labuhn et al.

(10) Patent No.: US 7,957,874 B2
(45) Date of Patent: Jun. 7, 2011

(54) OVERRIDE OF AUTOMATIC BRAKING IN A COLLISION MITIGATION AND/OR AVOIDANCE SYSTEM

(75) Inventors: Pamela I. Labuhn, Shelby Township, MI (US); Osman D. Altan, Northville, MI (US); Charles A. Green, Canton, MI (US); Uzmaa H. Balbale, Canton, MI (US); William J. Chundrlik, Jr., Rochester Hills, MI (US); Patrick J. O'Leary, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 277 days.

(21) Appl. No.: 11/687,701

(22) Filed: Mar. 19, 2007

(65) Prior Publication Data

US 2008/0234907 A1  Sep. 25, 2008

(51) Int. Cl.
*G06F 19/00* (2006.01)
(52) U.S. Cl. .......................................... 701/70; 701/301
(58) Field of Classification Search .................... 701/70, 701/301; 303/9, 125
See application file for complete search history.

(56) References Cited

U.S. PATENT DOCUMENTS

| | | | |
|---|---|---|---|
| 5,574,426 A | 11/1996 | Shisgal et al. | |
| 5,635,922 A | 6/1997 | Cho et al. | |
| 5,714,927 A | 2/1998 | Henderson et al. | |
| 5,864,285 A | 1/1999 | Wieder et al. | |
| 6,169,478 B1 | 1/2001 | Hada et al. | |
| 6,203,120 B1 | 3/2001 | Urai et al. | |
| 6,433,679 B1 | 8/2002 | Schmid | |
| 6,502,908 B1* | 1/2003 | Mueller et al. | 303/191 |
| 6,517,172 B1* | 2/2003 | Bond et al. | 303/193 |
| 6,594,614 B2 | 7/2003 | Studt et al. | |
| 6,842,684 B1 | 1/2005 | Kade et al. | |
| 7,027,920 B2 | 4/2006 | Madau | |
| 7,036,621 B2 | 5/2006 | Takafuji et al. | |
| 7,375,620 B2 | 5/2008 | Balbale et al. | |
| 7,719,410 B2 | 5/2010 | Labuhn et al. | |
| 2001/0049578 A1* | 12/2001 | Tamura et al. | 701/96 |
| 2004/0226768 A1* | 11/2004 | DeLuca et al. | 180/275 |
| 2005/0004760 A1 | 1/2005 | Urai et al. | |
| 2005/0107955 A1 | 5/2005 | Isaji et al. | |
| 2006/0250224 A1 | 11/2006 | Steffel et al. | |

OTHER PUBLICATIONS

Office Action dated Aug. 21, 2007, issued in U.S. Appl. No. 11/297,694.
Response to Office Action dated Oct. 30, 2007, filed in U.S. Appl. No. 11/297,694.
Notice of Allowance dated Jan. 28, 2008, issued in U.S. Appl. No. 11/297,694.
Office Action dated Feb. 12, 2009, issued in U.S. Appl. No. 11/620,752.
Response to Office Action dated Mar. 26, 2009, filed in U.S. Appl. No. 11/620,752.

(Continued)

*Primary Examiner* — Mark Hellner
*Assistant Examiner* — Helal A Algahaim
(74) *Attorney, Agent, or Firm* — Ingrassia Fisher & Lorenz, P.C.

(57) ABSTRACT

A method for returning driver control in a vehicle during automatic braking includes the steps of determining a minimum value of accelerator pedal position during the automatic braking, determining a current value of accelerator pedal position, and disengaging the automatic braking, if the current value is greater than the minimum value by at least a predetermined value.

20 Claims, 5 Drawing Sheets

OTHER PUBLICATIONS

Office Action dated Jul. 14, 2009, issued in U.S. Appl. No. 11/620,752.
Response to Office Action dated Sep. 21, 2009, filed in U.S. Appl. No. 11/620,752.
Notice of Allowance dated Oct. 6, 2009, issued in U.S. Appl. No. 11/620,752.
Notice of Allowance dated Jan. 19, 2010, issued in U.S. Appl. No. 11/620,752.

* cited by examiner

OVERRIDE OF AUTOMATIC BRAKING IN A COLLISION MITIGATION AND/OR AVOIDANCE SYSTEM

TECHNICAL FIELD

The present invention relates generally to vehicular obstacle detection and avoidance systems and, more particularly, to a method and system for returning braking control to a driver after automatic braking has been applied.

BACKGROUND OF THE INVENTION

In most circumstances, the driver of a vehicle (e.g., a car, truck, SUV, or other vehicle) has adequate visibility to permit the safe operation of his or her vehicle. Sometimes, however, drivers may encounter situations in which their ability to see the vehicle's path and obstacles within the vehicle's path is less than perfect.

A variety of obstacle detection and avoidance ("ODA") systems have been developed that alert a driver to obstacles near or within the vehicle's projected path, and/or that provide automatic braking in such events. However, in certain situations, a driver may wish to override the automatic braking of such ODA systems. Accordingly, it may be preferable to have an improved determination of when a driver wishes to override such ODA systems, and/or other automatic vehicle control systems, so as to selectively return control to the driver when the driver is attempting such an override.

Accordingly, it is desirable to provide an improved method and apparatus for overriding an automatic vehicle control system so as to selectively return vehicle control to the driver under such circumstances. Furthermore, other desirable features and functions of the present invention will become apparent from the subsequent detailed description of the invention and the appended claims, taken in conjunction with the accompanying drawings and this background of the invention.

SUMMARY OF THE INVENTION

A method is provided for returning driver control in a vehicle with an accelerator pedal during automatic braking. In one embodiment, and by way of example only, the method comprises the steps of determining a minimum value of accelerator pedal position during the automatic braking, determining a current value of accelerator pedal position, and disengaging the automatic braking, if the current value is greater than the minimum value by at least a predetermined value.

An apparatus is provided for a system for returning driver control in a vehicle with an accelerator pedal during automatic braking. In one embodiment, and by way of example only, the system comprises an accelerator pedal detector and a processor. The accelerator pedal detector is configured to detect accelerator pedal position during the automatic braking. The processor is configured to determine a minimum value of accelerator pedal position based on the detected accelerator pedal position during the automatic braking, determine a current value of accelerator pedal position based on the detected accelerator pedal position at a current point in time during the automatic braking, compare the current value and the minimum value, and disengage the automatic braking, if one or more of the following conditions are met: the current value is greater than or equal to a first predetermined value, or the current value is greater than the minimum value by at least a second predetermined value.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
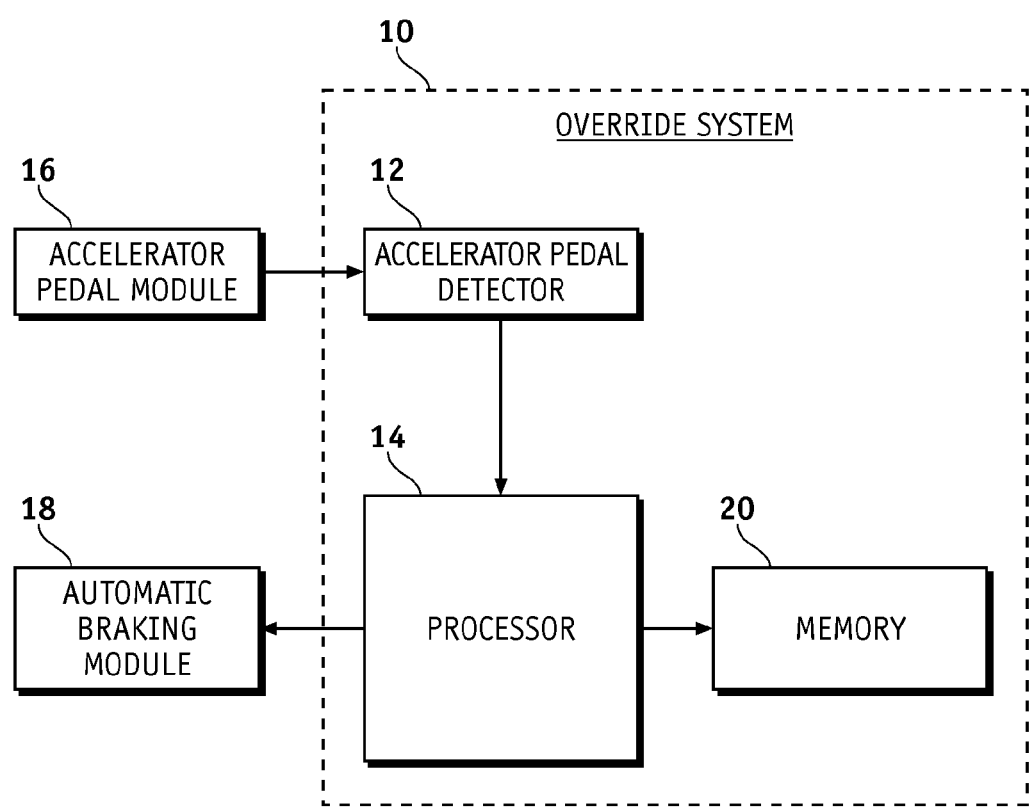
FIG. 1 is a functional block diagram of an override system for returning driver control in a vehicle with an accelerator pedal module and an automatic braking module.

FIG. 1 is a functional block diagram of an override system 10 for returning control of a vehicle to a driver thereof after automatic braking has been initiated and a valid override request has been detected. The override system 10 includes an accelerator pedal detector 12 and a processor 14, and is used in a vehicle having an accelerator pedal module 16 and an automatic braking module 18 (used to automatically apply vehicle brakes in certain situations, for example when an object is detected nearby). The override system 10 may also include a memory 20.

Preferably the override system 10 is configured to be implemented in connection with an obstacle detection and avoidance (ODA) system. Some or all of the override system 10, the accelerator pedal detector 12, the processor 14, the accelerator pedal module 16, the automatic braking module 18, and/or the memory 20 may also be part of such an ODA system. It will be appreciated that the override system 10 can also be implemented in connection with and/or as part of other types of ODA systems and/or other apparatus that provides automatic braking of a vehicle.

The accelerator pedal detector 12 is coupled to the accelerator pedal module 16, and is configured to periodically detect values of accelerator pedal position during application of automatic braking by the automatic braking module 18. The accelerator pedal detector 12 is further configured to transmit such accelerator pedal position values to the processor 14.

The processor 14 is coupled to the accelerator pedal detector 12 and the automatic braking module 18. The processor 14 receives the accelerator pedal position values from the accelerator pedal detector 12, and calculates a current accelerator pedal position value and a minimum accelerator pedal position value during the automatic braking. The processor 14 also performs multiple other determinations, comparisons, and/or calculations, such as subtracting the minimum accelerator pedal position value from the current accelerator pedal position value, thereby calculating an accelerator pedal difference, and/or calculating various time measurements, such as the amount of time that automatic braking has been applied or the amount of time that a driver override has continued, among various other types of determinations, comparisons, and/or calculations. The processor 14 is also configured to disengage the automatic braking, if one or more conditions apply, based on these determinations, comparisons, and/or calculations.

The memory 20 is coupled to the processor 14. The memory 20 is configured for storing various values, such as those described above in connection with the override system 10 and/or below in connection with the process 100, during or between various iterations of the process 100.

In one exemplary embodiment, the processor 14 is configured to disengage the automatic braking if the current accelerator pedal position value is greater than or equal to a first predetermined value, or if the accelerator pedal difference is greater than or equal to a second predetermined value. The processor 14 may be further configured to selectively disengage or re-engage the automatic braking based on one or more additional factors, such as an amount of elapsed time since the automatic braking has begun, and/or an amount of elapsed time after a driver override has been requested. These and other examples will be discussed in greater detail below in connection with the process 100 depicted in FIGS. 2-5.

Figure 2:
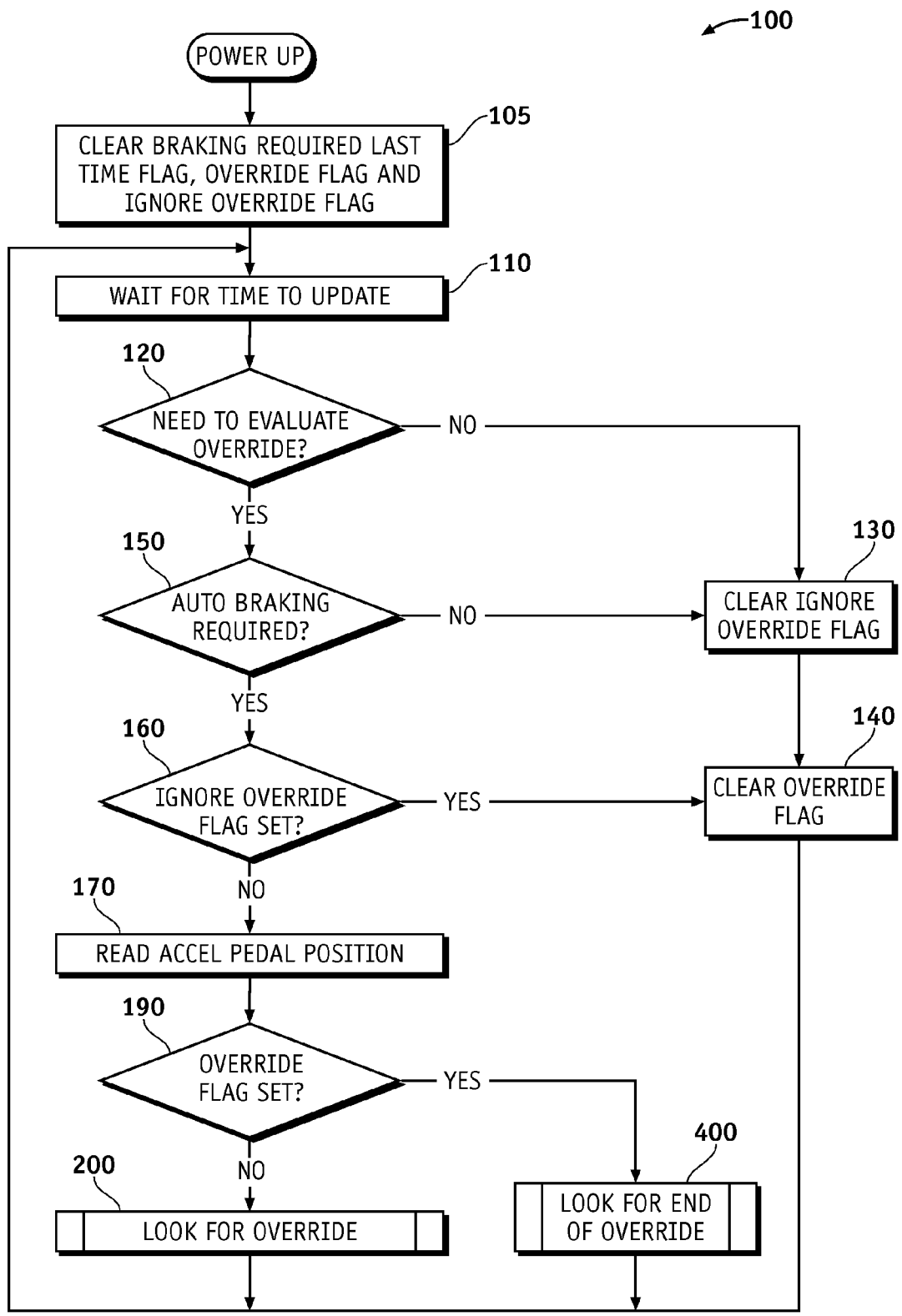
FIG. 2 is a flowchart depicting a process for returning driver control in a vehicle which can be used in conjunction with an override system such as that depicted in FIG. 1.

Turning now to FIG. 2, a flowchart is depicted of the above-mentioned exemplary process 100 for returning control of a vehicle to a driver thereof following a valid override request after automatic braking has been applied by the automatic braking module 18. The process 100 preferably runs through a plurality of iterations, using various flags to determine whether automatic braking has been implemented, whether an override has been detected, and whether an override should be ignored. The flags are preferably updated periodically through various iterations of the process 100 and stored in the memory 20. For example, a Braking Required Last Time Flag is used to keep track of whether automatic braking was applied during a prior iteration of the process 100. An Override Flag informs the processor 14 that a driver override has been requested. In response, the processor 14 disengages the automatic application of the brakes accordingly. An Ignore Override Flag is used to help ensure that the Override Flag is reset when certain conditions are satisfied, as will be explained in greater detail further below.

First, in step 105, after the vehicle is powered up, the Braking Required Last Time Flag, the Override Flag, and the Ignore Override Flag are each reset. After the three flags have been reset following power up, the process proceeds to step 110, in which the processor 14 waits until it is time to execute the remaining steps of the process 100. For example, in step 110 the processor 14 may wait until an object is detected by an ODA system which, as mentioned above, may also include the override system 10 in certain embodiments. The process 100 is intended to be executed with multiple iterations at a periodic rate, for example one iteration every 40 milliseconds. However, it will be appreciated that the rate at which the iterations are performed may vary. It will also be appreciated that the rate of execution of the iterations of the process 100 may differ from the rate in which any ODA systems, or portions thereof, are operating in connection therewith.

The process then proceeds to step 120, in which a determination is made as to whether an evaluation needs to be made as to whether a driver override has been requested. Such an evaluation may be needed, for example, if an object has been detected and an ODA system has activated the automatic braking module 18. However, in other situations, such as when an object has not been detected, and/or when a driver override is not permitted, such an evaluation may not be needed. This evaluation, and the other determinations, comparisons and calculations, and various other steps of the process 100, are preferably conducted by the processor 14.

If it is determined in step 120 that an evaluation is not needed as to whether a driver override has been requested, then the process proceeds to step 130, in which the Ignore Override Flag is reset, and then to step 140, in which the Override Flag is reset. Then the process returns to step 110, and the processor 14 waits for the next time the remaining steps of the process 100 are to be executed.

If it is determined in step 120 that an evaluation is needed as to whether a driver override has been requested, then the process proceeds to step 150, in which it is determined whether automatic braking is required. If it is determined in step 150 that automatic braking is not required, then the process proceeds to the above-mentioned steps 130 and 140, in which the Ignore Override Flag is reset and the Override Flag is reset, respectively, after which the process returns to step 110, and the processor 14 waits for the next time the remaining steps of the process 100 are to be executed. If it is determined in step 150 that automatic braking is required, then the process proceeds to step 160, as described below.

In step 160, it is determined whether the Ignore Override Flag is set. The Ignore Override Flag will not be set at this point in the first iteration of the process 100, as it has been reset in step 105, but it may be set at this point in subsequent iterations. If it is determined in step 160 that the Ignore Override Flag has been set, then the process proceeds to step 140, in which the Override Flag is reset, and then returns to step 110, and the processor 14 waits for the next time the remaining steps of the process 100 are to be executed. If it is determined in step 160 that the Ignore Override Flag has not been set, then the process proceeds to step 170, as described below.

In step 170, the accelerator pedal detector 12 determines a current value of accelerator pedal position from the accelerator pedal module 16 at a current point in time during the automatic braking event. The current accelerator pedal position value is preferably determined as a percentage, with zero percent corresponding to the driver not depressing the accelerator pedal at all, and with one hundred percent corresponding to the driver fully depressing the accelerator pedal. However, it will be appreciated that in various embodiments other determinations of accelerator pedal position may be utilized.

The process then proceeds to step 190, in which it is determined whether the Override Flag is set, or, in other words, whether the driver has already initiated an override. If it is determined in step 190 that the Override Flag is not set, then the process proceeds to step 200, in which the process looks for a driver override. If it is determined in step 190 that the Override Flag is set, then the process proceeds to step 400, in which the process looks for an end to the driver override. After either step 200 or step 400, as appropriate, is completed, the process returns to step 110, and the processor 14 waits for the next time the remaining steps of the process 100 are to be executed. Step 200 is shown in greater detail in FIGS. 3 and 4, and with reference thereto will be described below. Step 400 is shown in greater detail in FIG. 5, and with reference thereto will be described further below.

Figure 3:
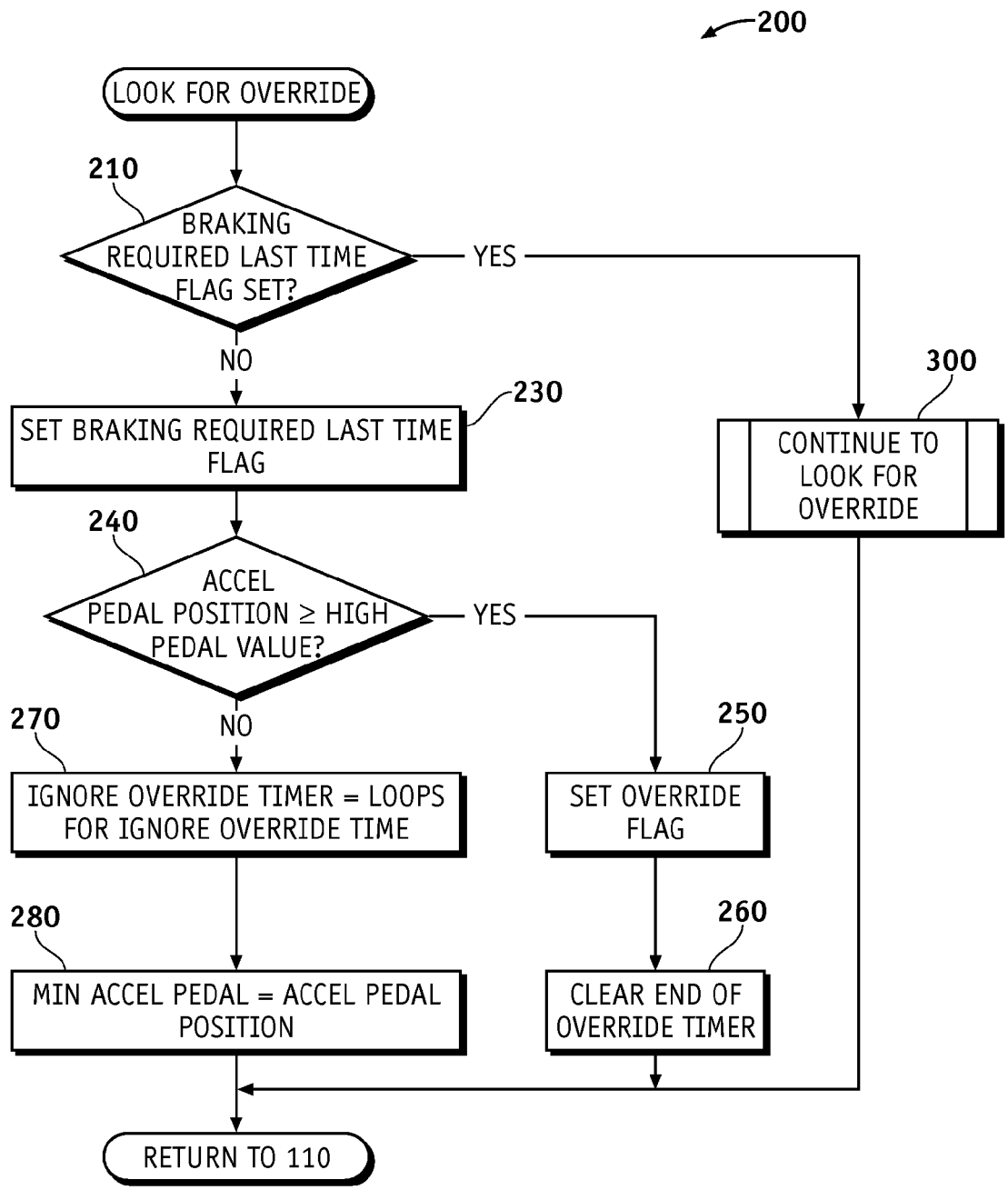
FIG. 3 is a flowchart depicting a portion of the process of FIG. 2, namely determining if a driver override has been requested.
Figure 4:
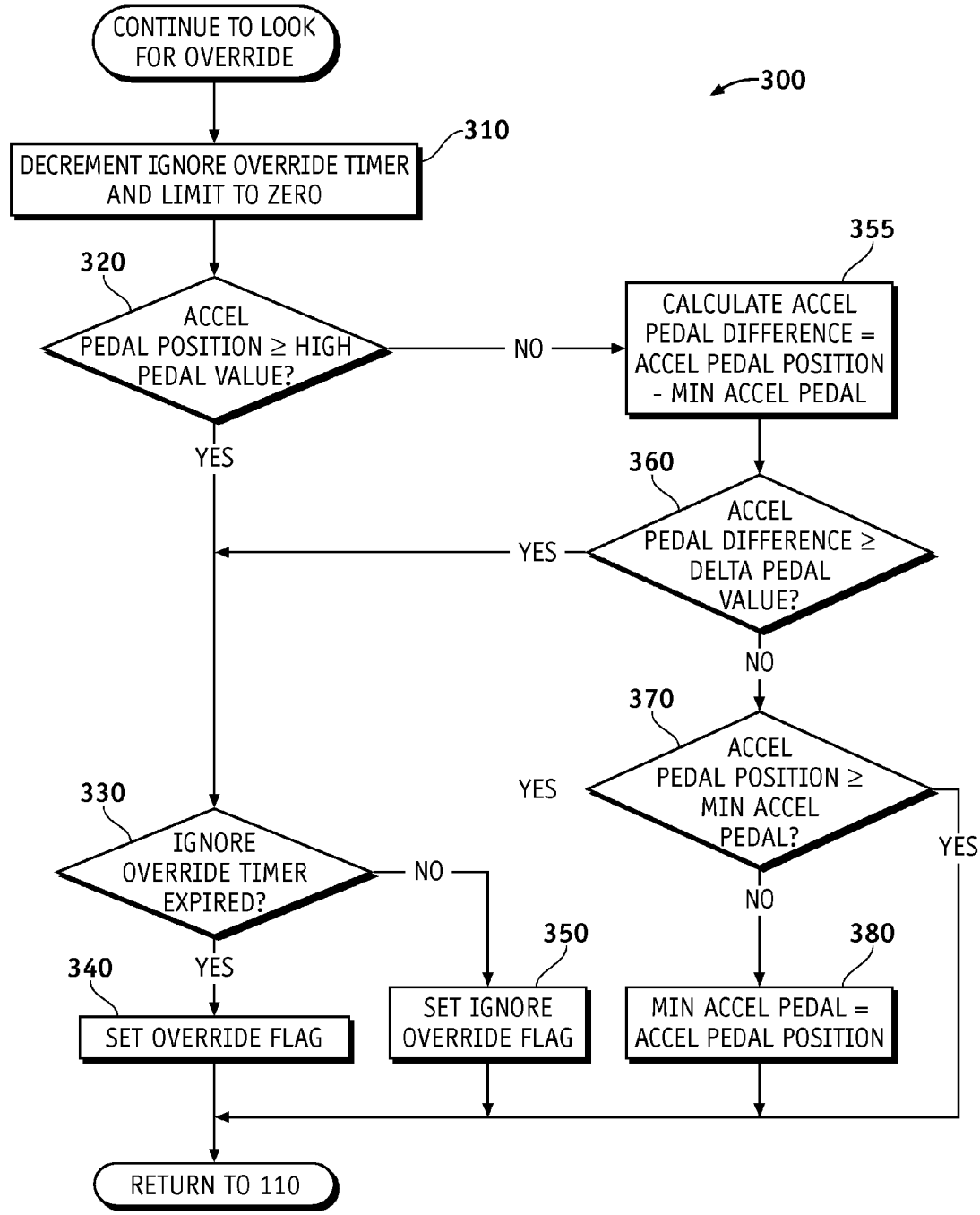
FIG. 4 is a flowchart depicting a sub-portion of the portion of the process depicted in FIG. 3.

Turning now to FIGS. 3 and 4, flowcharts are provided that show, in greater detail, the step 200 of looking for a driver override. First, and with reference to FIG. 3, in step 210 it is determined whether the Braking Required Last Time Flag is set. For example, the Braking Required Last Time Flag is set if automatic braking was required in a prior iteration of the process 100 and the Ignore Override Flag was not set during such iteration.

If it is determined in step 210 that the Braking Required Last Time Flag is set, then the process proceeds to step 300 to continue looking for an override. Step 300 is depicted in greater detail in FIG. 4, and with reference thereto will be described further below.

If it is determined in step 210 that the Braking Required Last Time Flag is not set, then the process proceeds to step 230, in which the Braking Required Last Time Flag is set, and preferably stored for use in subsequent iterations. This storage, and the other storage and/or retrieval steps in the process 100, are preferably conducted utilizing the memory 20. Next, in step 240, the current accelerator pedal position value, determined in step 170, is compared with a predetermined high pedal value. The high pedal value preferably corresponds to a value representative of a greater application of the accelerator pedal than is normally encountered in day to day driving unless the driver is involved in an evasive maneuver. Accordingly, the high pedal value is intended to represent a value indicating that the driver is attempting an override of the automatic braking. In one exemplary embodiment the high pedal value is sixty percent. However, it will be appreciated that in other embodiments the high pedal value may differ. Moreover, in certain embodiments, the high pedal value may be a function of one or more other measures, such as vehicle speed, transmission gear, driver mode select, and/or any one or more of a number of other types of measures.

If it is determined in step 240 that the current accelerator pedal position value is greater than or equal to the high pedal value, then the process proceeds to step 250. In step 250, the Override Flag is set, and the processor 14 disengages the automatic braking, thereby returning vehicle control to the driver. The process then proceeds to step 260, in which an end of override timer is reset. The end of override timer will be subsequently incremented through different iterations or loops of the process 100, in order to facilitate a subsequent determination of whether the override request has terminated. The process then may return to step 110, in which the processor 14 waits for the next time the remaining steps of the process 100 are to be executed, or may optionally proceed directly to step 400 of FIG. 5, in which, as discussed in greater detail further below, the process looks for an end to the override event.

If it is determined in step 240 that the current accelerator pedal position value is less than the high pedal value, then the process proceeds instead to step 270. In step 270, an ignore override timer is initialized to a number of loops corresponding to a predetermined ignore override time value. Values of the ignore override timer are periodically compared with the predetermined ignore override time value, which reflects a predetermined amount of time following the start of an automatic braking event in which certain increases in accelerator pedal position values are likely to be caused by factors other than a driver requested override. In one exemplary embodiment the predetermined ignore override time value is approximately 500 milliseconds. However, it will be appreciated that this may vary in different embodiments.

Next, in step 280, a minimum value of accelerator pedal position is calculated. The minimum value is preferably calculated in step 280 by the processor 14, based on the accelerator pedal position values determined through various iterations of step 170 during the automatic braking event. In one exemplary embodiment the minimum value is calculated from pedal position values over the entire duration of the automatic braking event, up until the point that such minimum value is determined in step 280 of a particular iteration. In certain other embodiments, the minimum value is calculated from pedal position values over only a portion of the automatic braking event, such as a portion of the automatic braking event starting at a predetermined time after the beginning of the automatic braking event (e.g., after the above-referenced predetermined ignore override time value has been reached), up until the point that such minimum value is determined in step 280 of a particular iteration. In either case, the minimum value has the potential to change with a different calculation in the step 280 of any particular iteration. The minimum value is preferably stored in the memory 20 for use during the next iteration of the process 100. Following step 280, the process then returns to step 110, and the processor 14 waits for the next time the remaining steps of the process 100 are to be executed.

Turning now to FIG. 4, a flowchart is provided showing, in greater detail, the step 300 of continuing to look for an override. As mentioned, this step occurs after it is determined in step 210 that the Braking Required Last Time Flag has been set (i.e., automatic braking has been applied). As described below in connection with FIG. 4, step 300 includes a number of "sub" steps 310-380. First, in step 310, the ignore override timer is decremented and limited to zero. In other words, the ignore override timer will continue to count down until the predetermined ignore override time value has been reached. Specifically, if certain conditions that might otherwise correspond to an override request are satisfied while the ignore override timer is non-zero, the override request will be ignored, as this is within a period of time in which certain accelerator pedal position changes are more likely to reflect factors other than a driver requested override. After updating the ignore override timer in step 310, the process proceeds to step 320, in which the current accelerator pedal position value is compared with the predetermined high pedal value.

If it is determined in step 320 that the current accelerator pedal position value is greater than or equal to the high pedal value, then the conditions for an override are tentatively considered to have been satisfied. Accordingly, the process then proceeds to step 330, in which it is determined whether the ignore override timer has expired. If it is determined in step 330 that the ignore override timer has expired (i.e., the ignore override timer is equal to zero), then the process proceeds to step 340, in which the Override Flag is set, and the processor 14 disengages the automatic braking, thereby returning vehicle control to the driver. If it is determined in step 330 that the ignore override timer has not expired (i.e., the ignore override timer is non-zero), then the process proceeds to step 350, in which the Ignore Override Flag is set. In either case, following step 340 or step 350, the process returns to step 110, and the processor 14 waits for the next time the remaining steps of the process 100 are to be executed.

Accordingly, in this embodiment, if the current accelerator pedal position value was initially less than the high pedal value as determined in step 240 (e.g., at the beginning of the automatic braking event) but is subsequently greater than or equal to the high pedal value at the time the subsequent determination is made in step 320, then an override request will be recognized only if the ignore override timer has expired. However, as described above and depicted in FIG. 3, if the current accelerator pedal position value was initially greater than or equal to the high pedal value as determined in step 240, then the override request would have been recognized at that time, the Override Flag would have been set in step 250, and vehicle control would have been returned to the driver at that time. This difference between steps 240 and 320 in this embodiment reflects the above-mentioned fact that factors other than a driver override are likely to be responsible for certain changes in accelerator pedal position for a brief period of time immediately following the beginning of the braking event. It will be appreciated that in other embodiments step 240 may instead apply the criteria of step 320, and/or vice versa, and/or that different high pedal values may be employed in steps 240 and 320, among other possible variations of these and/or steps of the process 100.

If it is determined in step 320 that the current accelerator pedal position value is less than the high pedal value, then the process proceeds instead to step 355. In step 355, the minimum value is subtracted from the current accelerator pedal position value, thereby generating an accelerator pedal difference. Next, in step 360, the accelerator pedal difference is compared with a predetermined delta pedal value, to determine whether the driver is requesting an override. Alternatively, steps 355 and 360 can be combined into the functionally equivalent steps of determining whether the current accelerator pedal position value is greater than the sum of the minimum value and the delta pedal value.

Preferably, the predetermined delta pedal value reflects a significant enough change in accelerator pedal position to indicate a deliberate driver action, but not too large so that a deliberate driver action is not detected as an override. In one exemplary embodiment the predetermined delta pedal value is representative of a twenty percent change in accelerator pedal position. However, this may vary in different embodiments.

If it is determined in step 360 that the accelerator pedal difference is greater than or equal to the predetermined delta pedal value (or, alternatively stated, that the current accelerator pedal position value is greater than the minimum value by an amount that is greater than or equal to the predetermined delta pedal value), then the conditions for an override are tentatively considered to have been satisfied, and the process proceeds to the above-described step 330.

If is determined in step 360 that the accelerator pedal difference is less than the predetermined delta pedal value (or, alternatively stated, that the current accelerator pedal position value is not greater than the minimum value by an amount that is greater than or equal to the predetermined delta pedal value), then the conditions for an override are considered to have not been satisfied, and the process proceeds instead to step 370, in which it is determined whether the minimum value needs to be updated.

Specifically, in step 370, it is determined whether the current accelerator pedal position value is greater than or equal to the minimum value as calculated in the previous iteration. If the answer to step 370 is yes, then the minimum value does not require updating, and the process proceeds to step 110. If the answer to step 370 is no, then the minimum value requires updating, and the process proceeds instead to step 380, in which the minimum value is reset to equal the current accelerator pedal position value at that particular point in time. Such a reset minimum value will then preferably be stored in the memory 20 and utilized in the next iteration of the process 100. Next, the process proceeds to step 110, and the processor 14 waits for the next time the remaining steps of the process 100 are to be executed.

Figure 5:
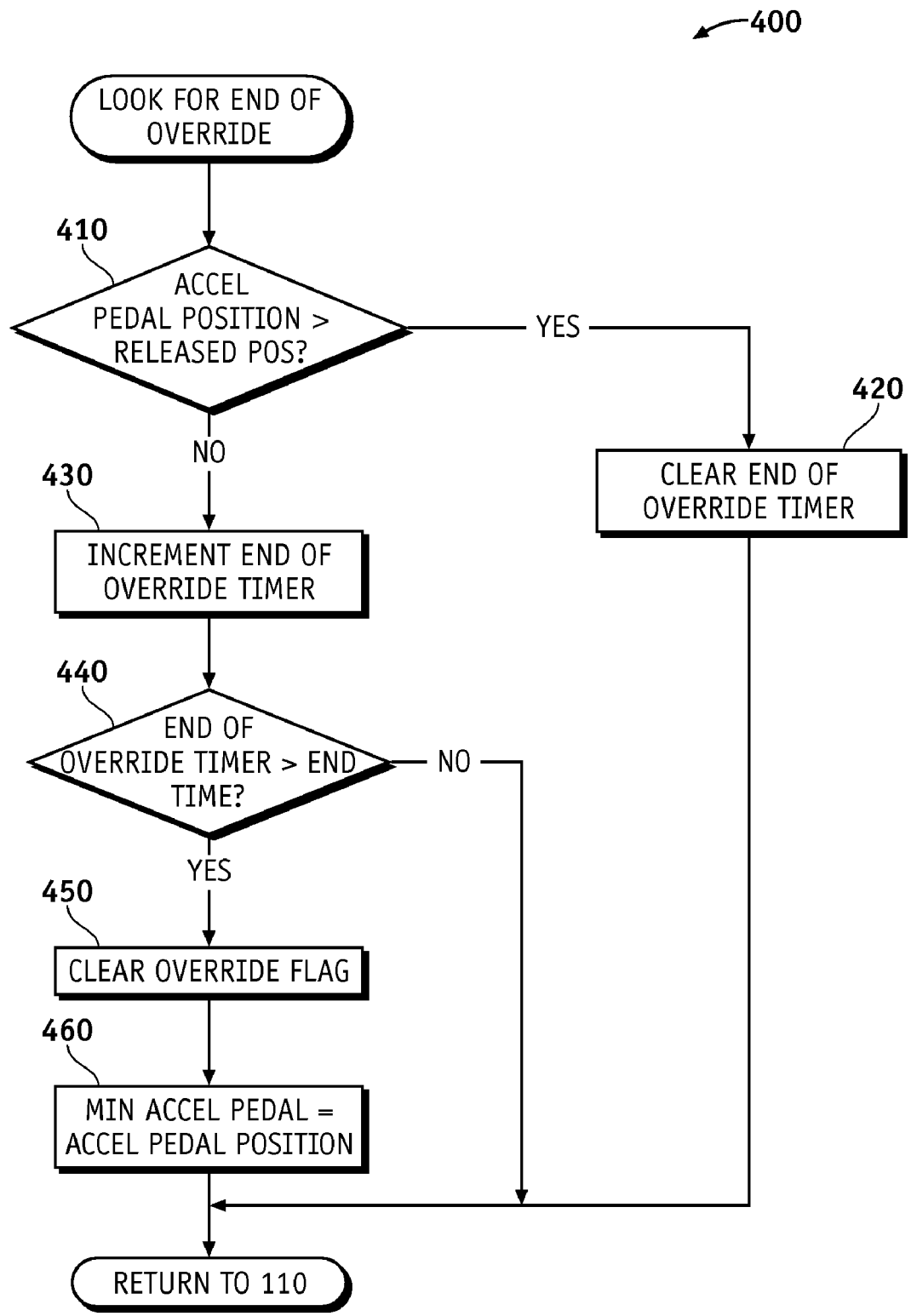
FIG. 5 is a flowchart depicting another portion of the process of FIG. 2, namely determining if an override request has been terminated.

Turning now to FIG. 5, a flowchart is provided showing, in detail, the step 400 of looking for an end of override event. As mentioned above, step 400 occurs after the Override Flag is set in step 190, and may also optionally occur directly after step 260 in certain embodiments. In step 400, a check is conducted for the end of the override event based on the accelerator pedal being released. Step 400 may include time hysteresis to allow the driver to release the accelerator pedal for a short duration without triggering a determination that the override event has terminated. However, in certain embodiments time hysteresis may not be necessary, for example, if an automatic braking event is short in duration. In addition, in certain situations a driver override may be terminated as a result of other circumstances, for example if it is determined in step 150 that automatic braking is no longer required.

As described below in connection with FIG. 5, step 400 includes a number of "sub" steps 410-460. First, in step 410, it is determined whether the current accelerator pedal position value is greater than a predetermined release position value. The predetermined release position value is preferably close to or equal to zero, and reflects a value indicating that the driver has released the accelerator pedal.

If it is determined in step 410 that the acceleration pedal position value is greater than the predetermined release position value (i.e., the accelerator pedal has not been released), the process proceeds to step 420, in which an end of override timer is reset. The end of override timer is preferably used to provide the above-mentioned time hysteresis on the override event, in order to check that the accelerator pedal has been released for at least a predetermined amount of time (preferably a short amount of time) before the override event is considered to have terminated. After the end of override timer is reset in step 420, the process returns to step 110, and the processor 14 waits for the next time the process 100 executes.

If it is determined in step 410 that the current accelerator pedal position value is less than or equal to the predetermined released position value (i.e., the driver has released the accelerator pedal), then the process proceeds to step 430. In step 430, the end of override timer is incremented. Next, in step 440, it is determined whether the end of override timer is greater than another predetermined amount of time reflecting termination of a typical override event. If the answer to step 440 is no, then the override is determined to continue, and the process returns to step 110, and the processor 14 waits for the next time the process 100 executes. If the answer to step 440 is yes, then the override is determined to have terminated, and the process proceeds to step 450. In step 450, the Override Flag is reset, and the processor 14 re-engages the automatic braking, thereby returning vehicle control to the ODA system. Next, in step 460, the minimum value is reset to the current accelerator pedal position value. The process then returns to step 110, and the processor 14 waits for the next time the process 100 executes.

The override system 10 and the process 100 allow the selective return of vehicle control to a driver when the driver is attempting an override of an ODA system in appropriate situations, and the return of control back to an ODA system in appropriate situations when the driver override has ended. It will be appreciated that the override system 10 may be used in connection with different variations of the process 100, and vice versa.

In addition, the process 100 may include any one or more of a number of different variations, such as those noted above, among other variations. For example, in certain embodiments, all override determinations may be ignored at the beginning of the automatic braking event, even if the current accelerator pedal position value is greater than or equal to the high pedal value. This can be accomplished under the embodiment of the process 100 discussed above, for example, by setting the high pedal value to one hundred percent in the above-described embodiment. Alternatively, in certain embodiments an override determination may only be allowed, during the beginning of the automatic braking event or shortly thereafter, if the driver has first released the accelerator pedal and then applied the accelerator pedal to at least a certain predetermined position.

As another example, alluded to above, the minimum value can be reset at the end of an initial period following the beginning of automatic braking rather than at the beginning of the automatic braking, or it can be set at some other predetermined point in between. In another example mentioned above, the high pedal value in step 240 in FIG. 3 (looking for an override) may differ from the high pedal value in step 320 in FIG. 4 (continuing to look for an override), for example because step 320 is further removed from the beginning of the automatic braking event. Also, certain other values, determinations, calculations, and/or comparisons, such as one or more rates of change of pedal position over a specific time period, can be employed as factors in determining overrides and returning vehicle control to the driver. These and/or other variations can be implemented alone or jointly in the process 100.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for returning driver control in a vehicle with an accelerator pedal during an automatic braking event, the method comprising the steps of:
    measuring a plurality of accelerator pedal position values during the automatic braking event, each of the plurality of accelerator pedal position values corresponding to an amount of depression of the accelerator pedal at a corresponding time during the automatic braking event, the plurality of accelerator pedal position values comprising a first accelerator pedal position and a second accelerator pedal position that is subsequent in time to the first accelerator pedal position; and
    disengaging the automatic braking, if the second accelerator pedal position is greater than a dynamic threshold, the dynamic threshold being dependent upon the first accelerator pedal position.

2. The method of claim 1, wherein the plurality of accelerator pedal position values comprises the first accelerator pedal position, the second accelerator pedal position, and one or more additional accelerator pedal positions that are prior in time to the second accelerator pedal position, and the method further comprises the step of:
    determining a minimum value from the first accelerator pedal position and the one or more additional accelerator pedal positions, wherein the automatic braking is disengaged if the second accelerator pedal position is greater than the minimum value by at least a predetermined amount.

3. The method of claim 2, wherein the predetermined amount is representative of an approximately twenty percent application of the accelerator pedal.

4. The method of claim 2, further comprising the step of:
    determining an amount of braking time during which the automatic braking has been applied, wherein the automatic braking is disengaged only upon the further condition that either the amount of braking time is greater than a predetermined time or the second accelerator pedal position is greater than or equal to a predetermined value at a beginning of the automatic braking event.

5. The method of claim 4, wherein the predetermined time is approximately 500 milliseconds.

6. The method of claim 2, wherein the minimum value is determined based on accelerator pedal position over a portion of the automatic braking event starting at a predetermined time after a beginning of the automatic braking event.

7. The method of claim 1, further comprising the steps of:
    determining an amount of release time during which the accelerator pedal has been released following the disengagement of the automatic braking; and
    re-engaging the automatic braking, if the amount of release time is greater than a predetermined time.

8. The method of claim 1, further comprising the steps of:
    determining a rate of change of accelerator pedal position during the automatic braking event; and
    disengaging the automatic braking if the rate of change is greater than a predetermined value.

9. A method for returning driver control in a vehicle with an accelerator pedal during an automatic braking event, the method comprising the steps of:
    measuring a plurality of accelerator pedal position values during the automatic braking event, each of the plurality of accelerator pedal position values corresponding to an amount of depression of the accelerator pedal at a corresponding time during the automatic braking event;
    determining a minimum value of accelerator pedal position from the plurality of accelerator pedal position values, the minimum value corresponding to a lowest amount of depression of the accelerator pedal position of the plurality of accelerator pedal position values;
    determining a current value of accelerator pedal position representing a current amount of depression of the accelerator pedal position; and
    disengaging the automatic braking, if the current value is greater than a dynamic threshold, the dynamic threshold being dependent upon the minimum value.

10. The method of claim 9, further comprising the step of:
    determining an amount of braking time during which the automatic braking has been applied, wherein the automatic braking is disengaged only upon the further condition that either the amount of braking time is greater than a predetermined time or the current value is greater than or equal to a first predetermined value at a beginning of the automatic braking event.

11. The method of claim 10, wherein:
    the predetermined value is representative of an approximately sixty percent application of the accelerator pedal; and
    the predetermined time is approximately 500 milliseconds.

12. The method of claim 9, further comprising the steps of:
    determining an amount of release time during which the accelerator pedal has been released following the disengagement of the automatic braking; and
    re-engaging the automatic braking, if the amount of release time is greater than a predetermined time.

13. A system for returning driver control in a vehicle with an accelerator pedal during an automatic braking event, the system comprising:
    an accelerator pedal detector configured to detect a plurality of accelerator pedal position values during the automatic braking event, each of the plurality of accelerator pedal position values corresponding to an amount of depression of the accelerator pedal at a corresponding time during the automatic braking event; and
    a processor configured to:

determine a minimum value of accelerator pedal position from the plurality of accelerator pedal position values, the minimum value corresponding to a lowest amount of depression of the accelerator pedal position of the plurality of accelerator pedal position values;

determine a current value of accelerator pedal position based on the detected accelerator pedal position at a current point in time during the automatic braking event; and disengage the automatic braking, if the current value is greater than a dynamic threshold, the dynamic threshold being dependent upon the minimum value.

14. The system of claim 13, wherein the automatic braking is disengaged if the current value is greater than the minimum value by a predetermined amount.

15. The system of claim 13, wherein the processor is further configured to:

determine an amount of braking time during which the automatic braking has been applied; and disengage the automatic braking only upon the further condition that either the amount of braking time is greater than a predetermined time or the current value is greater than or equal to a predetermined value at a beginning of the automatic braking.

16. The system of claim 15, wherein the predetermined time is approximately 500 milliseconds.

17. The system of claim 13, further comprising:

a memory configured to store, during the automatic braking, one or more values pertaining to accelerator pedal position and the amount of braking time for use in updating the minimum value.

18. The system of claim 13, wherein:

the accelerator pedal detector is further configured to detect accelerator pedal position following the disengagement of the automatic braking; and the processor is further configured to:

determine an amount of release time during which the accelerator pedal has been released following the disengagement of the automatic braking, based on the detected accelerator pedal position; and re-engage the automatic braking, if the amount of release time is greater than or equal to a predetermined time.

19. The method of claim 9, wherein the automatic braking is disengaged if the current value is greater than the minimum value by at least a predetermined amount.

20. The method of claim 19, wherein the predetermined amount is representative of an approximately twenty percent application of the accelerator pedal.

* * * * *